US007919745B2

(12) United States Patent
Shilov et al.

(10) Patent No.: US 7,919,745 B2

(45) Date of Patent: Apr. 5, 2011

(54) METHODS AND SYSTEMS FOR BACKGROUND CORRECTION IN TANDEM MASS SPECTROMETRY BASED QUANTITATION

(75) Inventors: Ignat V. Shilov, Palo Alto, CA (US); Wilfred H. Tang, Albany, CA (US)

(73) Assignee: DH Technologies Development Pte. Ltd., Singapore (SG)

( * ) Notice: Subject to any disclaimer, the term of this patent is extended or adjusted under 35 U.S.C. 154(b) by 413 days.

(21) Appl. No.: 12/208,277

(22) Filed: Sep. 10, 2008

(65) Prior Publication Data

US 2009/0065686 A1 Mar. 12, 2009

Related U.S. Application Data

(60) Provisional application No. 60/971,192, filed on Sep. 10, 2007.

(51) Int. Cl.
*B01D 59/44* (2006.01)

(52) U.S. Cl. ............... 250/281; 250/282; 435/6; 436/15

(58) Field of Classification Search .................. 250/281, 250/282; 435/4, 5, 6; 436/15, 173
See application file for complete search history.

(56) References Cited

U.S. PATENT DOCUMENTS 7,309,858 B2 * 12/2007 Pappin et al. ................ 250/282

* cited by examiner

*Primary Examiner* — Kiet T Nguyen

(74) *Attorney, Agent, or Firm* — John R. Kasha; Kasha Law LLC

(57) ABSTRACT

A corrected reporter ion intensity is calculated in tandem mass spectrometry based quantitation using isobaric labels. An analyte in each of two or more samples of a mixture of samples is labeled with a different isobaric label. The analyte is eluted from the mixture of samples and intensities of the eluting analyte are measured. An analyte intensity is selected at each of at least two times from the measured intensities. Tandem mass spectrometry is performed on the eluting analyte at each of the at least two times. A plurality of reporter ion intensities is produced. A system of linear equations is created expressing each reporter ion intensity of the plurality of reporter ion intensities as a sum of a background noise intensity and the product of a fragmentation efficiency and an analyte intensity. A corrected reporter ion intensity is calculated from a solution of the system of linear equations.

24 Claims, 7 Drawing Sheets

METHODS AND SYSTEMS FOR BACKGROUND CORRECTION IN TANDEM MASS SPECTROMETRY BASED QUANTITATION

CROSS-REFERENCE TO RELATED APPLICATION

This application claims the benefit of U.S. Provisional Patent Application No. 60/971,192 filed Sep. 10, 2007, which is incorporated by reference herein in its entirety.

INTRODUCTION

Tandem mass spectrometry (MS/MS) based quantitation is often a method of choice for researchers determining potential biomarkers via mass spectrometry. In this method a researcher labels different samples with isobaric, chemically equivalent labels that differ in the isotopic composition of their elements. Each label is designed to have a characteristic non-isobaric part, which identifies it uniquely. This non-isobaric part is called a reporter ion and can be observed in a mass spectrometer after MS/MS fragmentation. The variations in the intensities of different reporter ions can be attributed to the difference in relative concentrations of an analyte in various samples.

A method of MS/MS based quantitation using isobaric labels has several advantages over a single-stage mass spectrometry (MS) based quantitation method where different samples are labeled with non-isobaric isotopic labels. A method of MS/MS based quantitation using isobaric labels allows determination of relative concentrations unambiguously following confident identification of the analyte. It allows multiplexing without adding significant complexity to the sample. A downside of the method, in addition to the potential overlap of the reporter ions with amino acid related compounds, is the non-deterministic signal-to-noise ratio in the reporter ion intensity. A significant problem is that an unknown amount of the analyte signal is attributable to background molecules that are nearly isobaric (within one or several Daltons) with the analyte. Most of the background molecules are labeled with isotopic labels too and, therefore, collectively contribute to the signal in the reporter ion region.

BRIEF DESCRIPTION OF THE DRAWINGS

The skilled artisan will understand that the drawings, described below, are for illustration purposes only. The drawings are not intended to limit the scope of the present teachings in any way.

Figure 1:
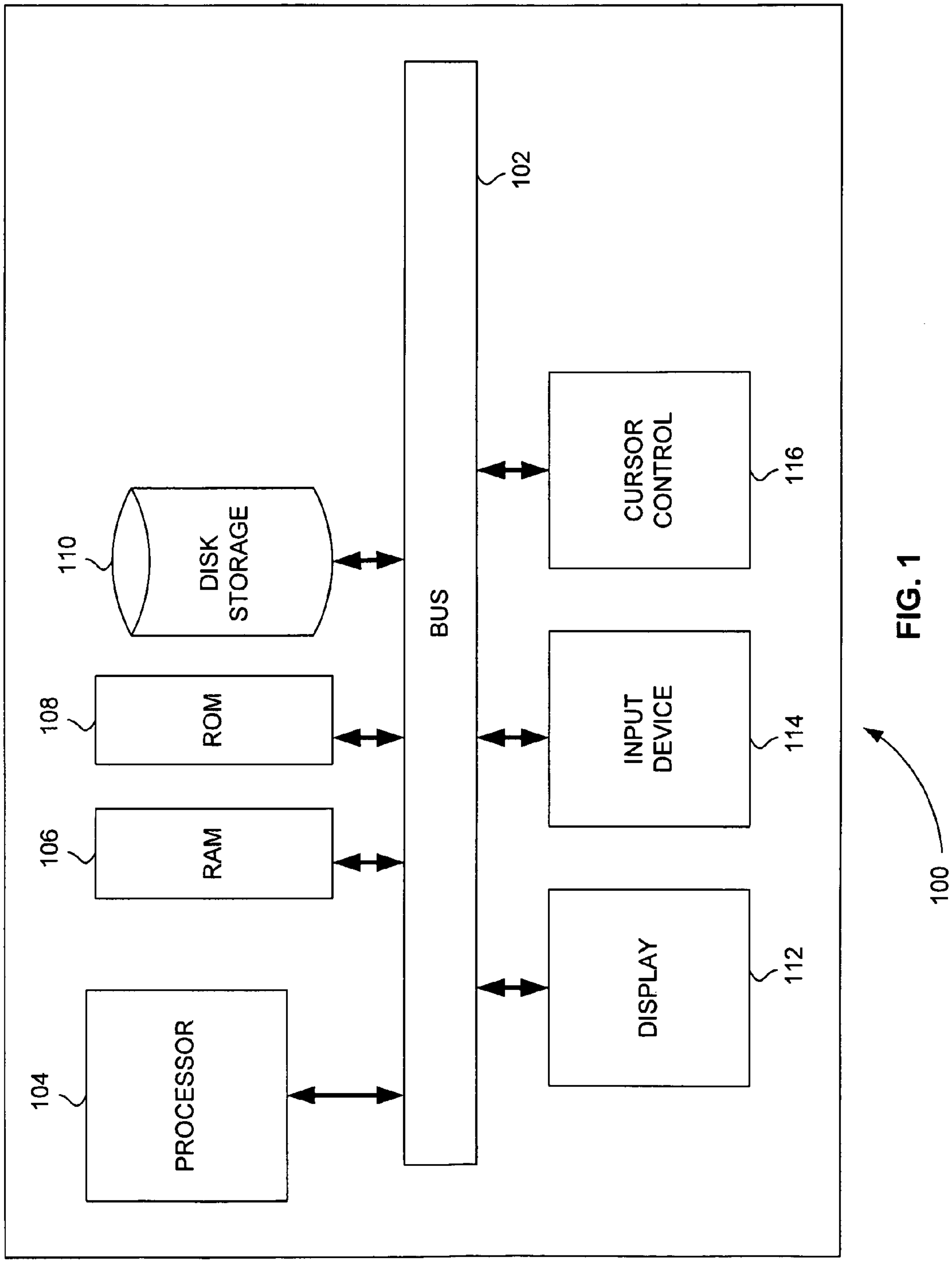
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. The present teachings are capable of other embodiments and of being practiced or being carried out in various ways. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for determining base calls, and instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

DEFINITIONS

For the purposes of interpreting this specification, the following definitions will apply and whenever appropriate, terms used in the singular will also include the plural and vice versa. The definitions set forth below shall supercede any conflicting definitions in any documents incorporated herein by reference.

As used herein, "label" refers to a moiety suitable to mark an analyte for determination. The term label is synonymous with the terms tag and mark and other equivalent terms and phrases. For example, a labeled analyte can be referred to as a tagged analyte or a marked analyte. Labels can be used in solution or can be used in combination with a solid support.

As used herein, "analyte" refers to a molecule of interest that may be determined. Non-limiting examples of analytes can include, but are not limited to, proteins, peptides, nucleic acids (both DNA or RNA), carbohydrates, lipids, steroids and/or other small molecules with a molecular weight of less than 1500 daltons. The source of the analyte, or the sample comprising the analyte, is not a limitation as it can come from any source. The analyte or analytes can be natural or synthetic.

Non-limiting examples of sources for the analyte, or the sample comprising the analyte, include, but are not limited to, cells or tissues, or cultures (or subcultures) thereof. Non-limiting examples of analyte sources include, but are not limited to, crude or processed cell lysates (including whole cell lysates), body fluids, tissue extracts or cell extracts. Still other non-limiting examples of sources for the analyte include, but are not limited to, fractions from a separation technique such as a chromatographic separation or an electrophoretic separation.

Body fluids include, but are not limited to, blood, urine, feces, spinal fluid, cerebral fluid, amniotic fluid, lymph fluid or a fluid from a glandular secretion. By processed cell lysate it is meant that the cell lysate is treated, in addition to the treatments needed to lyse the cell, to thereby perform additional processing of the collected material. For example, the sample can be a cell lysate comprising one or more analytes that are peptides formed by treatment of the total protein component of a crude cell lysate with a proteolytic enzyme to thereby digest precursor protein or proteins.

An isobaric labeling reagent, or isobaric label, can be used to label the analytes of a sample. Isobaric labels are particularly useful when a separation step is performed because the isobaric labels of a set of labeling reagents are structurally and chemically indistinguishable (and are indistinguishable by gross mass until fragmentation removes the reporter from the analyte). Thus, all analytes of identical composition that are labeled with different isobaric labels can chromatograph in exactly the same manner (i.e. co-elute). Because they are structurally and chemically indistinguishable, the eluent from the separation technique can comprise an amount of each isobarically labeled analyte that is in proportion to the amount of that labeled analyte in the sample mixture. Furthermore, from the knowledge of how the sample mixture was prepared (portions of samples, and other optional components (e.g. calibration standards) added to prepare the sample mixture), it is possible to relate the amount of labeled analyte in the sample mixture back to the amount of that labeled analyte in the sample from which it originated.

In various embodiments the processing of a sample or sample mixture of labeled analytes can involve separation. The separation can be performed by chromatography. For example, liquid chromatography/mass spectrometry (LC/MS) can be used to effect such a sample separation and mass analysis. Moreover, any chromatographic separation process suitable to separate the analytes of interest can be used. For example, the chromatographic separation can be normal phase chromatography, reversed-phase chromatography, ion-exchange chromatography, size exclusion chromatography, or affinity chromatography.

The separation can be performed electrophoretically. Non-limiting examples of electrophoretic separations techniques that can be used include, but are not limited to, one-dimensional electrophoretic separation, two-dimensional electrophoretic separation, and/or capillary electrophoretic separation.

As used herein, “fragmentation” refers to the breaking of a covalent bond. As used herein, “fragment” refers to a product of fragmentation (noun) or the operation of causing fragmentation (verb).

The methods and systems in various embodiments can be practiced using tandem mass spectrometers and other mass spectrometers that have the ability to select and fragment molecular ions. A tandem mass spectrometer performs a first mass analysis followed by a second mass analysis. Tandem mass spectrometers have the ability to select molecular ions (precursor ions) according to their mass-to-charge (m/z) ratio in a first mass analyzer, and then fragment the precursor ion and record the resulting fragment (daughter) ion spectra using a second mass analyzer. A mass analyzer is a single-stage mass spectrometer, for example. More specifically, daughter fragment ion spectra can be generated by subjecting precursor ions to dissociative energy levels (e.g. collision-induced dissociation (CID)) using a second mass analyzer. For example, ions corresponding to labeled peptides of a particular m/z ratio can be selected from a first mass analysis, fragmented and reanalyzed in a second mass analysis. Representative instruments that can perform such tandem mass analysis include, but are not limited to, magnetic four-sector, tandem time-of-flight, triple quadrupole, ion-trap, and hybrid quadrupole time-of-flight (Q-TOF) mass spectrometers.

These types of mass spectrometers may be used in conjunction with a variety of ionization sources, including, but not limited to, electrospray ionization (ESI) and matrix-assisted laser desorption ionization (MALDI). Ionization sources can be used to generate charged species for the first mass analysis where the analytes do not already possess a fixed charge. Additional mass spectrometry instruments and fragmentation methods include post-source decay in MALDI-MS instruments and high-energy CID using MALDI-TOF (time of flight)-TOF MS.

Methods of Data Processing

As detailed above, when performing tandem mass spectrometry (MS/MS) based quantitation using isobaric labels, an unknown amount of the analyte signal can be attributable to background molecules that are nearly isobaric with the analyte. An exemplary isobaric label is an isobaric tag for relative and absolute quantitation (ITRAQ™) reagent.

Without prior knowledge of the relative fragmentation efficiency of the reporter ions of the isobaric labels, it is difficult to predict the amount of signal in the reporter ion region that is related to the background molecules (or noise). If the amount of signal in the reporter ion region that is related to the background molecules is not taken into account, the resulting relative quantitation estimates of the MS/MS based quantitation using isobaric labels can converge to unity.

In various embodiments, the amount of signal in the reporter ion region that is related to the background molecules is taken into account by obtaining additional MS/MS information around an eluting analyte. The additional MS/MS information is obtained from at least one extra MS/MS acquisition at a point of time where precursor ion intensity is sufficiently different from a previous MS/MS acquisition. Even though different peptides with mass-to-charge (m/z) values close to each other can be observed at about the same time in liquid chromatography (LC) experiments, their concentrations are changing independently during the time course. This difference in the concentration over time allows for the separation of reporter ion signal contributions from different peptides. The information about individual signal contributions can be calculated by multiple observations of the reporter ion region and analyte precursor region at different points of time during elution of the analyte.

A general calculation can be done in the following linear form, which can be solved if the number of observation time points equals or exceeds the number of simultaneously observed components.

$$|S_{total}|=|C|\cdot|F|,$$

where $|S_{total}|$ is a vector of measurement for the sum over all reporter ion signals at different points of time. $|C|$, is a matrix of the single-stage mass spectrometry (MS) intensities for various components in the precursor window at different points of time, and $|F|$ is a vector of reporter fragmentation efficiencies for the observed components. Some mass spectrometry instruments acquire MS/MS for different lengths of time. So, $|S_{total}|$ can be normalized with respect to acquisition time. Solving for $|F|$ in terms of the measured values $|S_{total}|$ and $|C|$ yields the equation $$|F|=C^T\cdot C|^{-1}\cdot|C|^T\cdot|S_{total}|$$

The background portion of the signal, as denoted by the b subscripts, can be described in terms of the following background (vector).

$$|B_{total}|=|=|C_b|\cdot|F_b|$$

It is assumed that the background portion of the signal arises from the aggregate contributions of many different peptides or analytes. In a typical relative quantitation experiment, it is commonly assumed that the relative concentrations of a majority of the peptides or analytes are unchanged among the samples, and thus the background portion of the signal is constant (i.e., invariant across all reporter ion channels, or labels) after compensating for possible unequal amounts of sample being mixed together (this compensation can be called bias correction). The assumption of background invariance across reporter ion channels means that at any given time point, the background for each individual reporter ion can be calculated as $B_{total}/n$, where $B_{total}$ is the entry in the $|B_{total}|$ vector for the time point of interest and n is the number of reporter ion channels.

The estimate of the background can then be used to compute a corrected reporter ion signal at any given time point as $$S_i^{corrected}=S_i-B_{total}/n$$

where i represents the index of the reporter ion.

Figure 2:
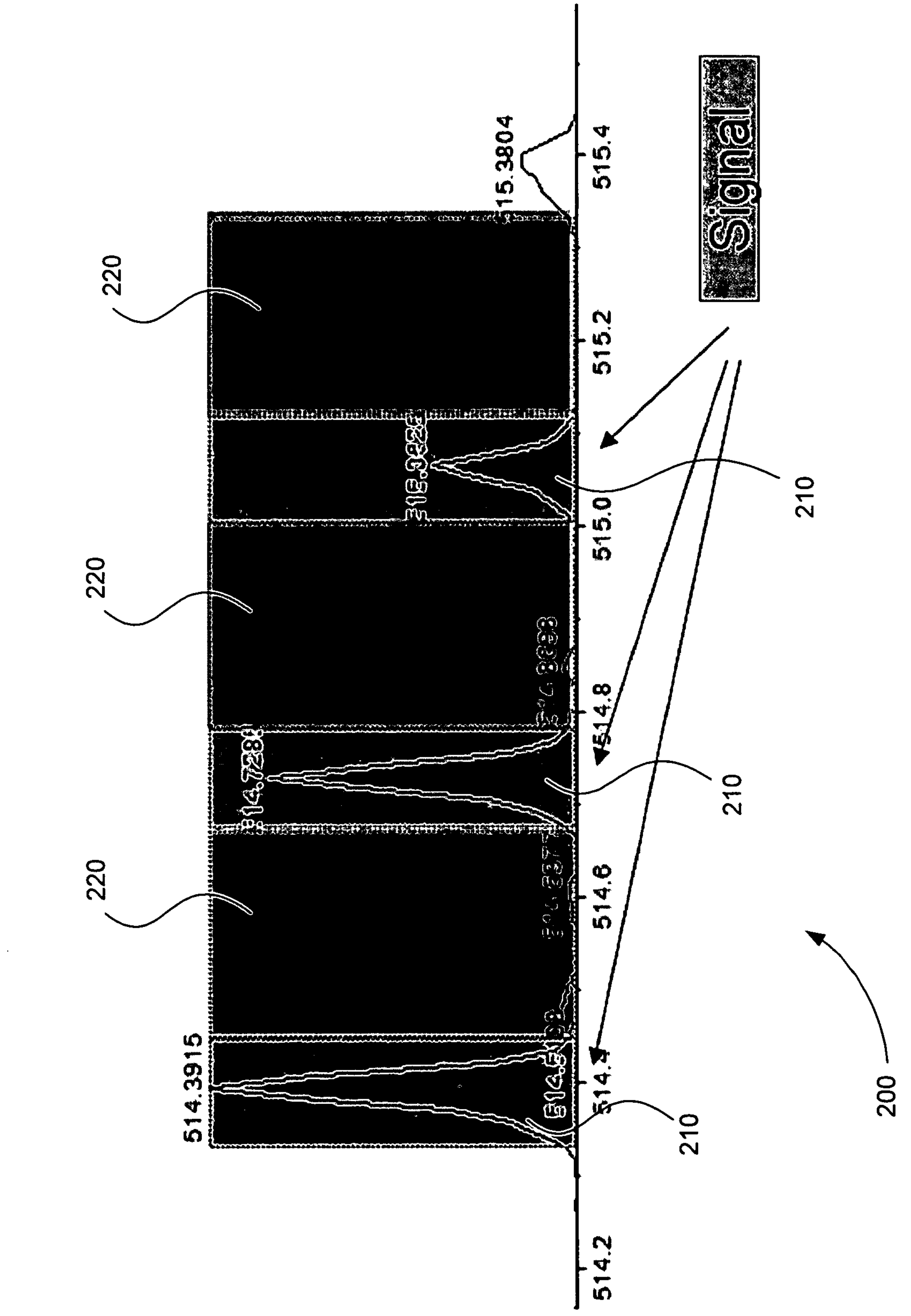
FIG. 2 is an exemplary plot of a spectrum of a theoretical analyte after single-stage mass spectrometry (MS), in accordance with the present teachings.

FIG. 2 is an exemplary plot 200 of a spectrum of a theoretical analyte after single-stage mass spectrometry (MS), in accordance with the present teachings. The region of the spectrum shown in FIG. 2 represents the precursor ion region of the theoretical analyte selected for fragmentation. Areas 210 represent the analyte signal and areas 220 represent the background molecule or noise signal.

Figure 3:
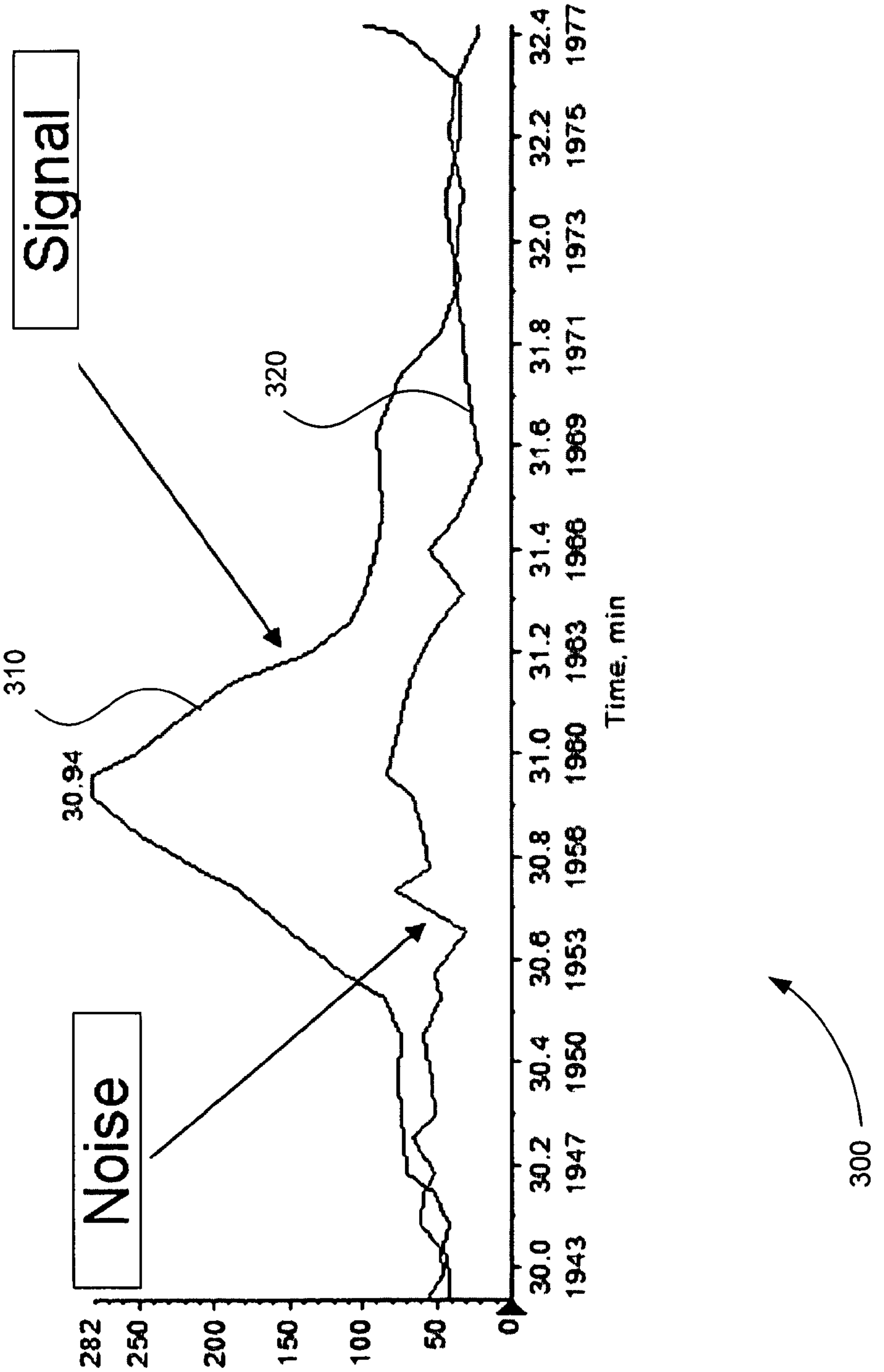
FIG. 3 is an exemplary plot of an elution profile of the theoretical analyte shown in FIG. 2, in accordance with the present teachings.

FIG. 3 is an exemplary plot 300 of an elution profile of the theoretical analyte shown in FIG. 2, in accordance with the present teachings. Signal 310 is the analyte signal and signal 320 is the background molecule or noise signal. Plot 300 shows the slow change of the intensity of the background molecule signal relative to the analyte signal.

Figure 4:
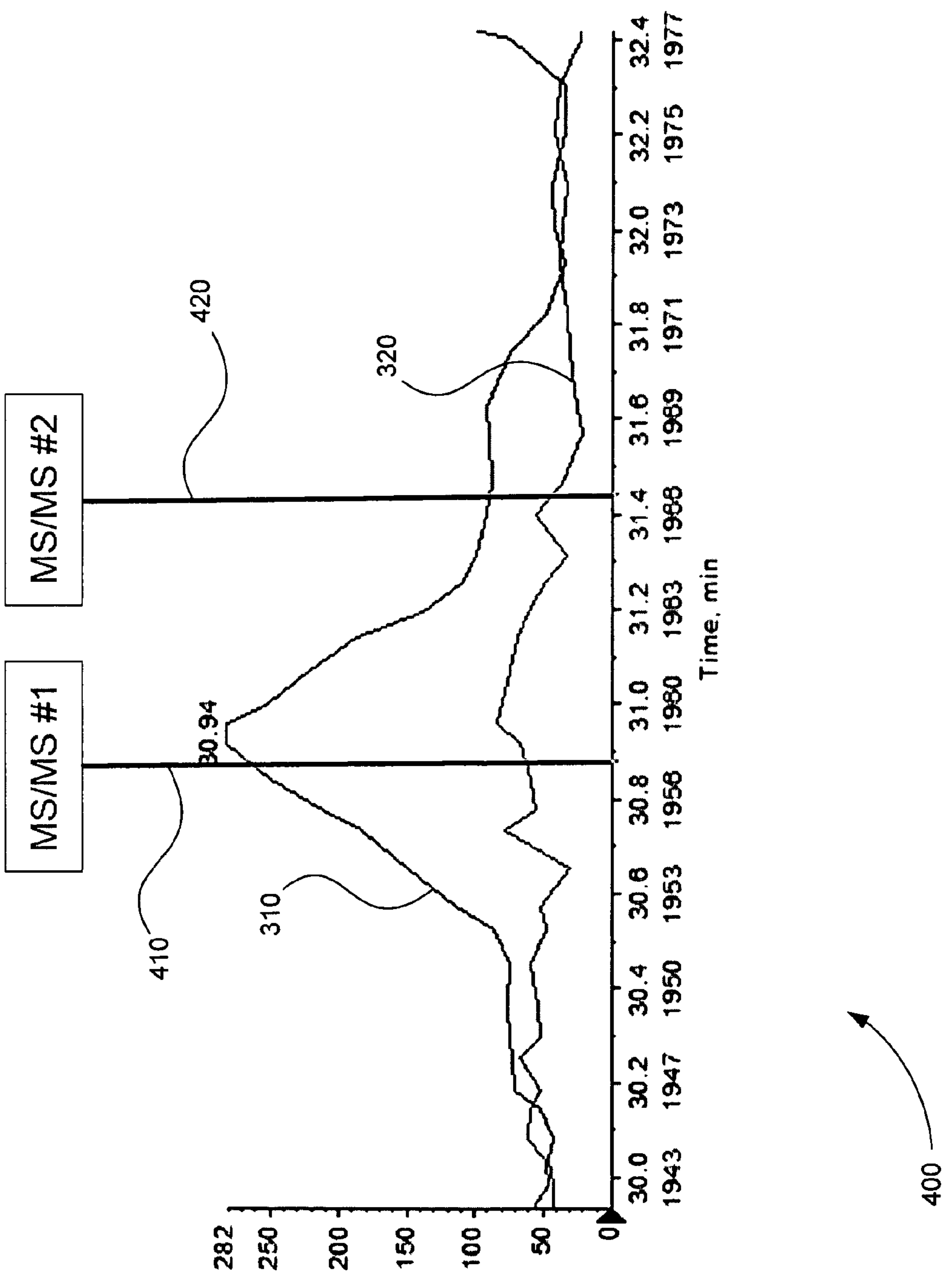
FIG. 4 is an exemplary plot of an elution profile of the theoretical analyte shown in FIG. 2 showing exemplary locations in time where tandem mass spectrometry (MS/MS) acquisitions can take place, in accordance with the present teachings.

FIG. 4 is an exemplary plot 400 of an elution profile of the theoretical analyte shown in FIG. 2 showing exemplary locations in time where tandem mass spectrometry (MS/MS) acquisitions can take place, in accordance with the present teachings. MS/MS acquisition location 410 is shown at approximately 30.88 minutes and MS/MS acquisition location 420 is shown at approximately 31.44 minutes. Analyte signal 310 is near a maximum at MS/MS acquisition location 410 and analyte signal 310 is near a minimum at MS/MS acquisition location 420. Background signal 320 varies little from MS/MS acquisition location 410 to MS/MS acquisition location 420. By performing a first MS/MS acquisition at MS/MS acquisition location 410 and a second MS/MS acquisition at MS/MS acquisition location 420, the amount of signal in the reporter ion region that is related to the background molecules can be taken into account. The analyte precursor ion intensity is sufficiently different at these two locations.

The general equations described above can be simplified if the additional assumption is made that the background does not change over time (i.e., that the background is invariant over time). Relative invariance in time of the background molecule signal 320 can be confirmed by doing multiple reaction monitoring (MRM) studies on reporter ions, for example.

The additional assumption that the background does not vary over time enables the following simpler starting equation.

$$|S_{total}|=|C|\cdot F+|I|\cdot k_{total}$$

where |I| is a vector of all 1's, $k_{total}$ is the sum of the background over all reporter ion channels, and |C| and F represent the single-stage mass spectrometry (MS) intensities at different time points and the fragmentation efficiency respectively for the analyte of interest only. Note that the notation convention in this equation differs slightly from the notation convention in the previous, more general equation in that |C| and |F| in the previous equation represent quantities from all components, including both the analyte of interest and the background, whereas |C| and F in the current equation represent the analyte of interest only. Also note that, whereas in the previous equation, |C| is a matrix and |F| is a vector, in the current equation, |C| reduces to a vector and F reduces to a scalar because |C| and F only represent a single analyte.

To take a concrete example, consider the case where there are observations of MS/MS acquisitions at two different points of time. Our equation for the 2-time point case is $$S_1^{total}=C_1\cdot F+k_{total}$$

$$S_2^{total}=C_2\cdot F+k_{total}$$

and the parameters F and k can be determined as $$F=\frac{S_1^{total}-S_2^{total}}{C_1-C_2}$$

$$k_{total}=\frac{\left[S_1^{total}-\frac{C_1}{C_2}\cdot(S_2^{total})\right]}{\left(1-\frac{C_1}{C_2}\right)}$$

To take a concrete example, consider the case where there are four isobaric labels (4-plex ITRAQ™ reagents) that have reporter ions with mass-to-charge ratios of 114, 115, 116, and 117. The assumption that the background does not vary across reporter ion channels means that the background for each individual reporter ion channel can be calculated as $k=k_{total}/4$, or (using $S_1^{total}=S_1^{114}+S_1^{115}+S_1^{116}+S_1^{117}$ and $S_2^{total}=S_2^{114}+S_2^{115}+S_2^{116}+S_2^{117}$) as $$k=\frac{\left[\begin{array}{c}S_1^{114}+S_1^{115}+S_1^{116}+S_1^{117}-\\ \frac{C_1}{C_2}\cdot(S_2^{114}+S_2^{115}+S_2^{116}+S_2^{117})\end{array}\right]}{4\cdot\left(1-\frac{C_1}{C_2}\right)}.$$

This equation can be rearranged as $$k=\left(\begin{array}{c}\frac{S_1^{114}-\frac{C_1}{C_2}\cdot S_2^{114}}{1-\frac{C_1}{C_2}}+\frac{S_1^{115}-\frac{C_1}{C_2}\cdot S_2^{115}}{1-\frac{C_1}{C_2}}+\\ \frac{S_1^{116}-\frac{C_1}{C_2}\cdot S_2^{116}}{1-\frac{C_1}{C_2}}+\frac{S_1^{117}-\frac{C_1}{C_2}\cdot S_2^{117}}{1-\frac{C_1}{C_2}}\end{array}\right)\Big/4.$$

This rearranged equation suggests that k is separable into individual estimates for each of the four isobaric labels (channels) and k is the average value for all four estimates. Indeed, a calculation similar in spirit to the preceding description, except that the equations are written for each separate reporter ion channel rather than for the sum over the reporter ion channels, does in fact show that four separate estimates can be obtained for k, one for each reporter ion channel.

$$k=\frac{S_1^{114}-\frac{C_1}{C_2}\cdot S_2^{114}}{1-\frac{C_1}{C_2}}$$

$$k=\frac{S_1^{115}-\frac{C_1}{C_2}\cdot S_2^{115}}{1-\frac{C_1}{C_2}}$$

$$k=\frac{S_1^{116}-\frac{C_1}{C_2}\cdot S_2^{116}}{1-\frac{C_1}{C_2}}$$

$$k=\frac{S_1^{117}-\frac{C_1}{C_2}\cdot S_2^{117}}{1-\frac{C_1}{C_2}}$$

A natural way to obtain a single estimate for k is to average these four estimates. In addition, these equations for the four estimates of k can also be obtained by setting $b_{t=1}$ equal to $b_{t=2}$ in the equations below. In any event, the estimated background k is then subtracted from the measured reporter ion signal to obtain a corrected reporter ion signal.

In various embodiments, a background calculation can be done by doing an estimate of the background molecule or noise contribution across all reporter ions or channels simultaneously and by assuming the background molecule contribution is invariant across the channels. It is possible to combine observations from each channel and find the background molecule contribution optimally satisfying observations of the signal across all the channels. The background, background molecule contribution, or background noise intensity can be used to determine a corrected reporter ion intensity. A corrected reporter ion intensity is, for example, obtained by removing the background, background molecule contribution, or background noise intensity from a measured reporter ion intensity.

For example, an MS/MS based quantitation using four isobaric labels can be performed with two MS/MS acquisitions. The following equations use four labels for concreteness, but all the equations generalize to situations with more labels or fewer labels. Observed reporter ion intensities are directly related to the analyte contributions from specific samples.

$$S_{114,t=1}=F_c\cdot C_{114,t=1}+b_{t=1}$$

$$S_{115,t=1}=F_c\cdot C_{115,t=1}+b_{t=1}$$

$$S_{116,t=1}=F_c\cdot C_{116,t=1}+b_{t=1}$$

$$S_{117,t=1}=F_c\cdot C_{117,t=1}+b_{t=1}$$

$$S_{114,t=2}=F_c\cdot C_{114,t=2}+b_{t=2}$$

$$S_{115,t=2}=F_c\cdot C_{115,t=2}+b_{t=2}$$

$$S_{116,t=2}=F_c\cdot C_{116,t=2}+b_{t=2}$$

$$S_{117,t=2}=F_c\cdot C_{117,t=2}+b_{t=2}$$

$F_c$ is the fragmentation efficiency of an analyte of interest, $b_{t-1}$ is the background signal during the first MS/MS acquisition, $b_{t=2}$ is the background signal during the second MS/MS acquisition, and $C_{114,t=1}$, $c_{115,t=1}$, $C_{116,t=1}$, $C_{117,t=1}$ are intensities of peptide components from different samples. These are not observable directly. Instead their sum is observed as intensity of the precursor in MS scan.

$$C_{t=1} = C_{114,t=1} + C_{115,t=1} + C_{116,t=1} + C_{117,t=1}$$

$$C_{t=2} = C_{114,t=2} + C_{115,t=2} + C_{116,t=2} + C_{117,t=2}$$

h

A reasonable assumption can be made that ratio of different components to the total sum of all component are invariant in time.

$$\frac{C_{114,t=1}}{C_{t=1}} = \frac{C_{114,t=2}}{C_{t=2}} = R_{114},$$

$$\frac{C_{115,t=1}}{C_{t=1}} = \frac{C_{115,t=2}}{C_{t=2}} = R_{115},$$

$$\frac{C_{116,t=1}}{C_{t=1}} = \frac{C_{116,t=2}}{C_{t=2}} = R_{116},$$

$$\frac{C_{117,t=1}}{C_{t=1}} = \frac{C_{117,t=2}}{C_{t=2}} = R_{117}$$

So the initial formula can be rewritten as follows.

$$S_{114,t=1}=F_c\cdot R_{114}\cdot C_{t=1}+b_{t=1}$$

$$S_{115,t=1}=F_c\cdot R_{115}\cdot C_{t=1}{'}b_{t=1}$$

$$S_{116,t=1}=F_c\cdot R_{116}\cdot C_{t=1}+b_{t=1}$$

$$S_{117,t=1}=F_c\cdot R_{117}\cdot C_{t=1}+b_{t=1}$$

$$S_{114,t=2}=F_c\cdot R_{114}\cdot C_{t=2}+b_{t=2}$$

$$S_{115,t=2}=F_c\cdot R_{115}\cdot C_{t=2}+b_{t=2}$$

$$S_{116,t=2}=F_c\cdot R_{116}\cdot C_{t=2}+b_{t=2}$$

$$S_{117,t=2}=F_c\cdot R_{117}\cdot C_{t=2}+b_{t=2}$$

For simplicity, let $G_{114}=F_cR_{114}$, $G_{115}=F_cR_{115}$, $G_{116}=F_cR_{116}$, $G_{117}=F_cR_{117}$, then the above formula can be rewritten as the formula below.

$$S_{114,t=1}=G_{114}\cdot C_{t=1}+b_{t=1}$$

$$S_{115,t=1}=G_{115}\cdot C_{t=1}+b_{t=1}$$

$$S_{116,t=1}=G_{116}\cdot C_{t=1}+b_{t=1}$$

$$S_{117,t=1}=G_{117}\cdot C_{t=1}+b_{t=1}$$

$$S_{114,t=2}=G_{114}\cdot C_{t=2}+b_{t=2}$$

$$S_{115,t=2}=G_{115}\cdot C_{t=2}+b_{t=2}$$

$$S_{116,t=2}=G_{116}\cdot C_{t=2}+b_{t=2}$$

$$S_{117,t=2}=G_{114}\cdot C_{t=2}+b_{t=2}$$

This formula can be written in the following matrix form.

$$\begin{bmatrix} S_{114,t=1} \\ S_{115,t=1} \\ S_{116,t=1} \\ S_{117,t=1} \\ S_{114,t=2} \\ S_{115,t=2} \\ S_{116,t=2} \\ S_{117,t=2} \end{bmatrix} \begin{bmatrix} C_{t=1} & 0 & 0 & 0 & 1 & 0 \\ 0 & C_{t=1} & 0 & 0 & 1 & 0 \\ 0 & 0 & C_{t=1} & 0 & 1 & 0 \\ 0 & 0 & 0 & C_{t=1} & 1 & 0 \\ C_{t=2} & 0 & 0 & 0 & 0 & 1 \\ 0 & C_{t=2} & 0 & 0 & 0 & 1 \\ 0 & 0 & C_{t=2} & 0 & 0 & 1 \\ 0 & 0 & 0 & C_{t=2} & 0 & 1 \end{bmatrix} \cdot \begin{bmatrix} G_{114} \\ G_{115} \\ G_{116} \\ G_{117} \\ b_{t=1} \\ b_{t=2} \end{bmatrix}$$

This overdefined matrix and can be optimally solved according to the following equations.

$$y=A\cdot x$$

$$x=(A^TA)^{-1}A^T\cdot y$$

The preceding equations and discussion about the equations are based on the use of MS/MS acquisitions at two time points. Note that the preceding discussion can be generalized to use more than two MS/MS acquisitions.

Figure 5:
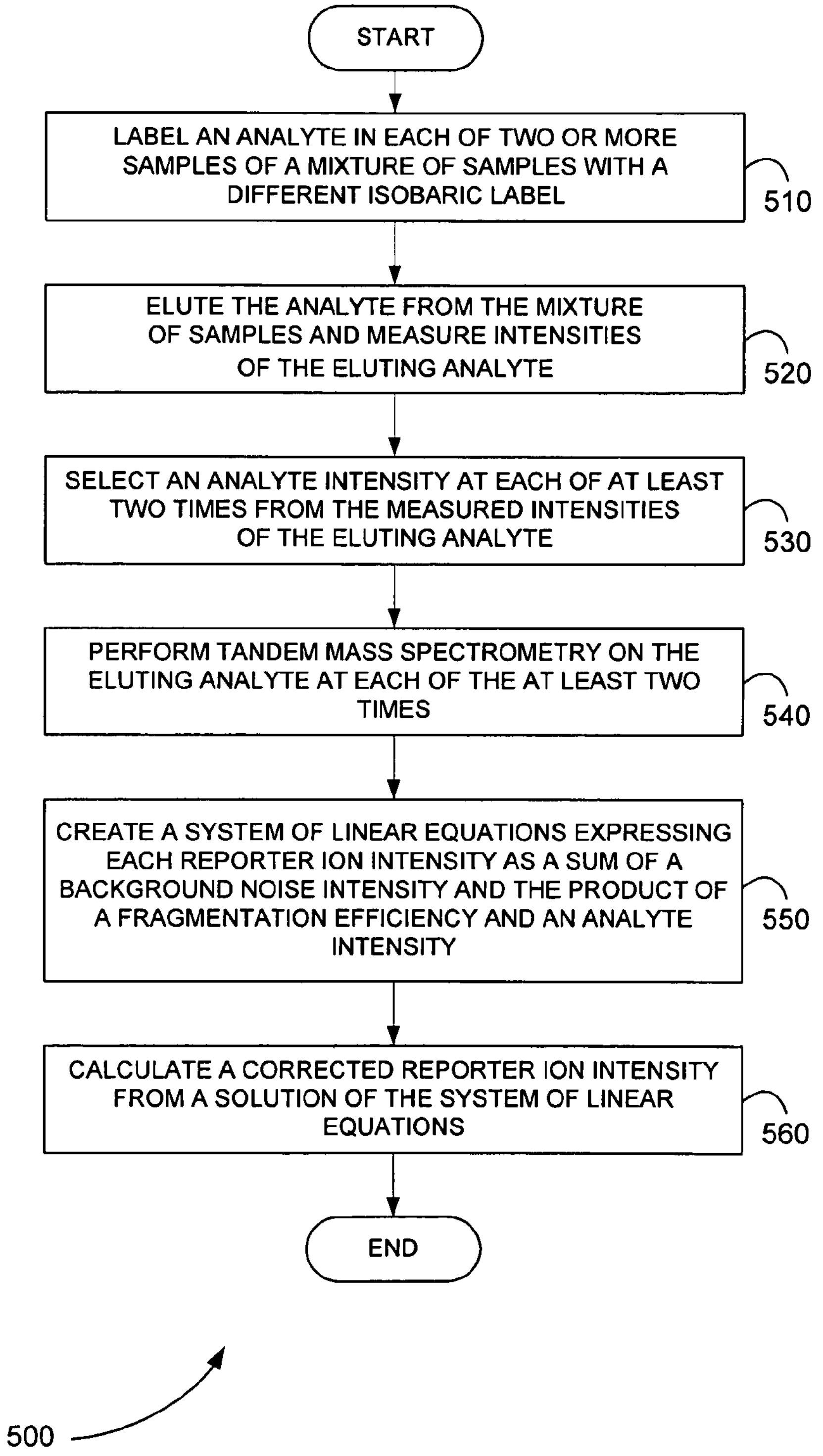
FIG. 5 is an exemplary flowchart showing a method for calculating a corrected reporter ion intensity in tandem mass spectrometry based quantitation using two or more two isobaric labels and performing tandem mass spectrometry at two or more different elution times that is consistent with the present teachings.

FIG. 5 is an exemplary flowchart showing a method 500 for calculating a corrected reporter ion intensity in tandem mass spectrometry based quantitation using two or more two isobaric labels and performing tandem mass spectrometry at two or more different elution times that is consistent with the present teachings.

In step 510 of method 500, an analyte in each of two or more samples of a mixture of samples is labeled with a different isobaric label resulting in the use of two or more isobaric labels. The two or more isobaric labels are, for example, isobaric tag for relative and absolute quantitation (ITRAQ™) reagents.

In step 520, the analyte is eluted from the mixture of samples using a separation technique and intensities of the eluting analyte are measured using a mass analysis technique. The separation technique can include, but is not limited to, a chromatographic separation or an electrophoretic separation. The mass analysis technique can include single-stage mass spectrometry, for example.

In step 530, an analyte intensity is selected at each of at least two times from the measured intensities of the eluting analyte. At least two analyte intensities are produced. For example, a first analyte intensity is selected near a maximum intensity of the eluting analyte and a second analyte intensity is selected near a minimum intensity of the eluting analyte.

The first analyte intensity and the second analyte intensity are selected, for example, by calculating a derivative of the measured intensities of the eluting analyte. Ideally, the first analyte intensity and the second analyte intensity are selected at points of time that represent the largest difference in the ratio of signal-to-noise. In other words, the signal-to-noise ratio of the first analyte intensity should be far different from the signal-to-noise ratio of the second analyte intensity. In various embodiments, the first analyte intensity and the second analyte intensity are selected at points of time that are close to each other, so that the background noise intensity does not change significantly.

In step 540, tandem mass spectrometry is performed on the eluting analyte at each of the at least two times. A plurality of reporter ion intensities is produced that represent each permutation of the two or more isobaric labels and the at least two times. For example, the analyte is selected in a first mass analysis of the tandem mass spectrometry and the analyte is fragmented and the plurality of reporter ion intensities is measured in a second mass analysis of the tandem mass spectrometry. In various embodiments, at least one of the plurality of reporter ion intensities includes an ion intensity per unit of time. In various embodiments, at least one of the plurality of reporter ion intensities includes an absolute ion intensity.

In step 550, a system of linear equations is created expressing each reporter ion intensity of the plurality of reporter ion intensities as a sum of the background noise intensity and the product of a fragmentation efficiency and one of the at least two analyte intensities. In creating the system of linear equations, the background noise intensity is assumed to be or constrained to be invariant for calculations made for each of the two or more isobaric labels, for example. In various embodiments, in creating the system of linear equations, the background noise intensity is constrained to be invariant for calculations made for each of the two or more times.

In step 560, a corrected reporter ion intensity is calculated from a solution of the system of linear equations. For example, the corrected reporter ion intensity is calculated by solving the system of linear equations for the background noise intensity and subtracting the background noise intensity from at least one of the plurality of reporter ion intensities to produce the corrected reporter ion intensity. In various embodiments, the background noise intensity is further used to correct a ratio of a first reporter ion intensity to a second reporter ion intensity. In various embodiments, the fragment efficiency is estimated by solving the system of linear equations for the fragment efficiency.

Figure 6:
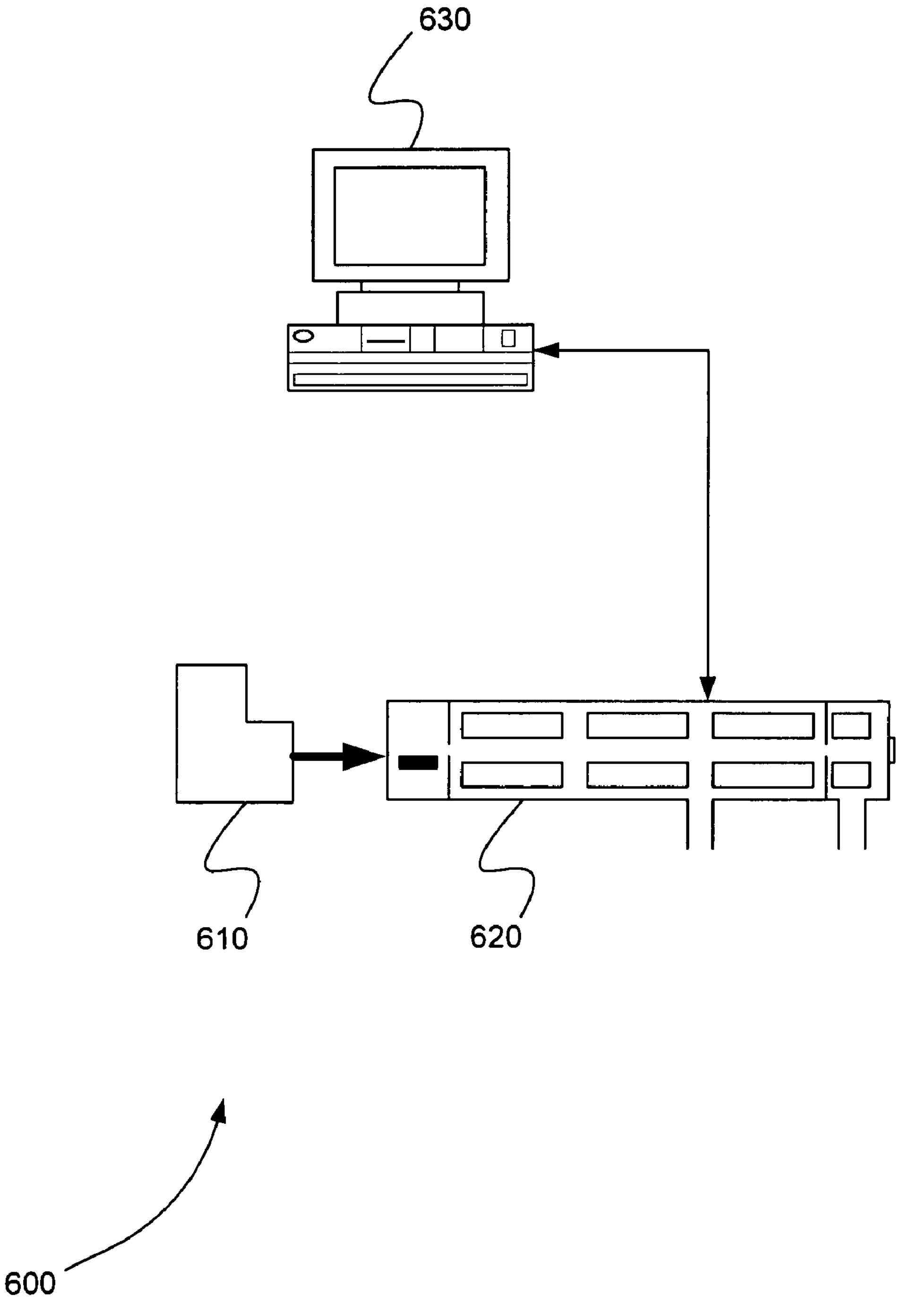
FIG. 6 is a schematic diagram showing a system for calculating a corrected reporter ion intensity in tandem mass spectrometry based quantitation using two or more two isobaric labels and performing tandem mass spectrometry at two or more different elution times that is consistent with the present teachings.

FIG. 6 is a schematic diagram showing a system 600 for calculating a corrected reporter ion intensity in tandem mass spectrometry based quantitation using two or more two isobaric labels and performing tandem mass spectrometry at two or more different elution times that is consistent with the present teachings. System 600 includes separation device 610, mass spectrometer 620, and processor 630. Separation device 610 elutes an analyte from a mixture of samples. The analyte in each of two or more samples of the mixture of samples is labeled with a different isobaric label resulting in the use of two or more isobaric labels. Separation device 610 can include, but is not limited to, a chromatographic device or an electrophoretic device.

Mass spectrometer 620 receives the eluting analyte from separation device 610, measures intensities of the eluting analyte, and selects an analyte intensity at each of at least two times during elution of the analyte from the measured intensities of the eluting analyte producing at least two analyte intensities.

Mass spectrometer 620 performs tandem mass spectrometry on the eluting analyte at each of the at least two times and measures a plurality of reporter ion intensities that represent each permutation of the two or more isobaric labels and the at least two times. Mass spectrometer 620 is, for example, a tandem mass spectrometer. Mass spectrometer 620 can be, but is not limited to, a magnetic four-sector mass spectrometer, a tandem time-of-flight mass spectrometer, a triple quadrupole mass spectrometer, an ion-trap mass spectrometer, or a hybrid quadrupole time-of-flight (Q-TOF) mass spectrometer.

Processor 630 is connected to mass spectrometer 620. In various embodiments, processor 630 can also be connected to separation device 610. Processor 630 receives at least two analyte intensities and receives the plurality of reporter ion intensities from mass spectrometer 620. Processor 630 creates a system of linear equations expressing each reporter ion intensity of the plurality of reporter ion intensities as a sum of a background noise intensity and a product of a fragmentation efficiency and one of the at least two analyte intensities.

Processor 630 calculates a corrected reporter ion intensity from a solution of the system of linear equations. For example, processor 630 can calculate the corrected reporter ion intensity from a solution of the system of linear equations by solving the system of linear equations for the background noise intensity and subtracting the background noise intensity from at least one reporter ion intensity of the plurality of reporter ion intensities to produce the corrected reporter ion intensity. Processor 630 can be, but is not limited to, a computer, microprocessor, or any device capable of sending and receiving control signals from separation device 610 and mass spectrometer 620, and processing information.

Figure 7:
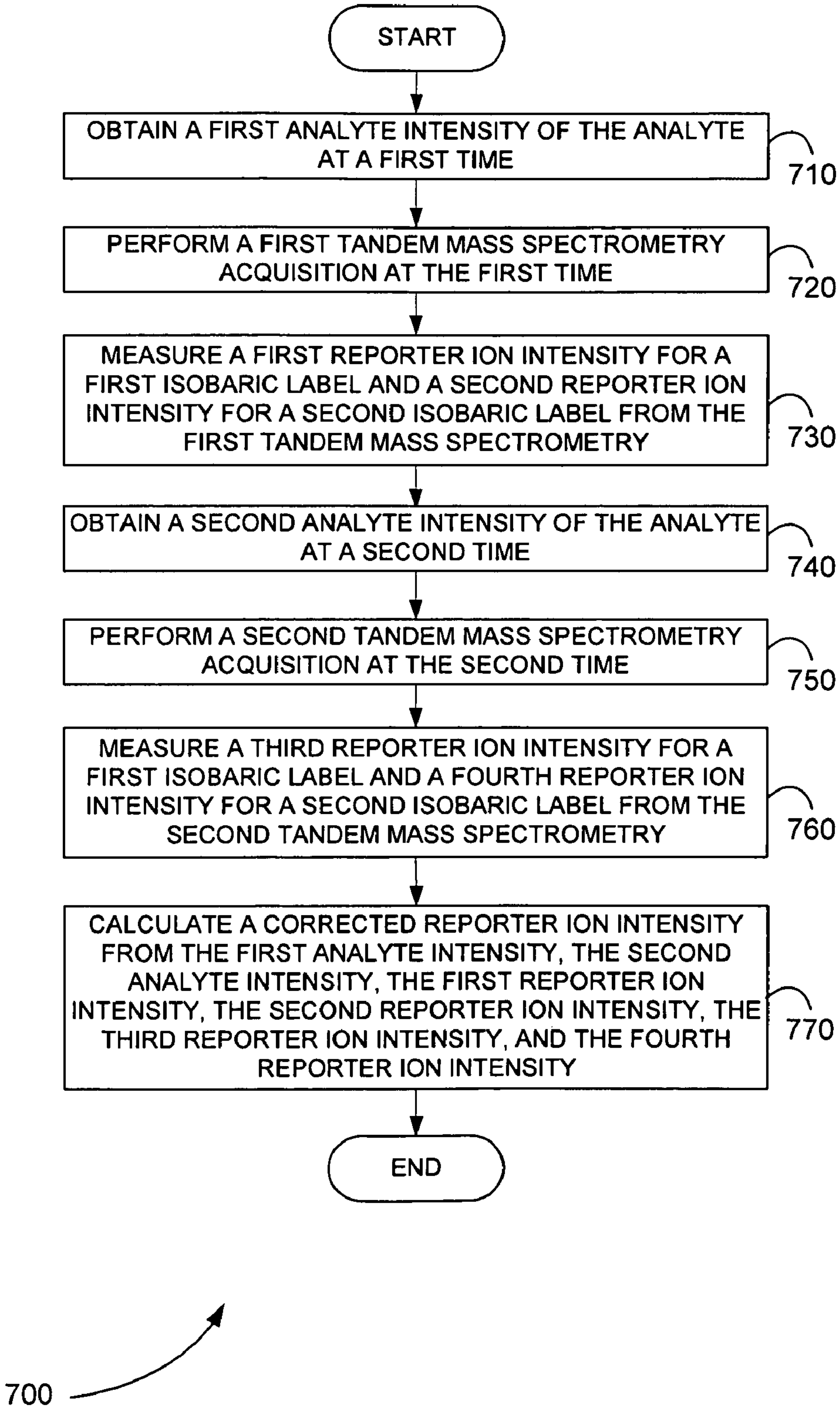
FIG. 7 is an exemplary flowchart showing a method for correcting a quantitation ratio from tandem mass spectrometry based quantitation using two isobaric labels and performing tandem mass spectrometry at two different elution times that is consistent with the present teachings.

FIG. 7 is an exemplary flowchart showing a method 700 for correcting a quantitation ratio from tandem mass spectrometry based quantitation using two isobaric labels and performing tandem mass spectrometry at two different elution times that is consistent with the present teachings.

In step 710 of method 700, a first analyte intensity of the analyte is obtained at a first time.

In step 720, a first tandem mass spectrometry acquisition is performed at the first time.

In step 730, a first reporter ion intensity for a first isobaric label and a second reporter ion intensity for a second isobaric label are measured from the first tandem mass spectrometry.

In step 740, a second analyte intensity of the analyte is obtained at a second time.

In step 750, a second tandem mass spectrometry acquisition is performed at the second time.

In step 760, a third reporter ion intensity for a first isobaric label and a fourth reporter ion intensity for a second isobaric label are measured from the second tandem mass spectrometry.

In step 770, a corrected reporter ion intensity is calculated from the first analyte intensity, the second analyte intensity, the first reporter ion intensity, the second reporter ion intensity, the third reporter ion intensity, and the fourth reporter ion intensity. The corrected reporter ion intensity can be calculated, for example, by calculating a background noise intensity from the first analyte intensity, the second analyte intensity, the first reporter ion intensity, the second reporter ion intensity, the third reporter ion intensity, and the fourth reporter ion intensity, and subtracting the background noise intensity from the first reporter ion intensity to produce the corrected reporter ion intensity. In various embodiments, the background noise intensity is constrained to be the same for the first isobaric label and the second isobaric label. In various embodiments, the background noise intensity is constrained to be the same for the first time and the second time.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A method for calculating a corrected reporter ion intensity in tandem mass spectrometry based quantitation using isobaric labels, comprising:

labeling an analyte in each of two or more samples of a mixture of samples with a different isobaric label resulting in the use of two or more isobaric labels;

eluting the analyte from the mixture of samples using a separation technique and measuring intensities of the eluting analyte using a mass analysis technique;

selecting an analyte intensity at each of at least two times from the measured intensities of the eluting analyte producing at least two analyte intensities;

performing tandem mass spectrometry on the eluting analyte at each of the at least two times producing a plurality of reporter ion intensities that represent each permutation of the two or more isobaric labels and the at least two times;

creating a system of linear equations expressing each reporter ion intensity of the plurality of reporter ion intensities as a sum of a background noise intensity and a product of a fragmentation efficiency and one of the at least two analyte intensities; and calculating a corrected reporter ion intensity from a solution of the system of linear equations.

2. The method of claim 1, wherein calculating a corrected reporter ion intensity from a solution of the system of linear equations comprises estimating a background noise intensity by solving the system of linear equations for the background noise intensity and subtracting the background noise intensity from at least one reporter ion intensity of the plurality of reporter ion intensities to produce the corrected reporter ion intensity.

3. The method of claim 1, wherein at least one of the plurality of reporter ion intensities comprises an ion intensity per unit of time.

4. The method of claim 1, wherein at least one of the plurality of reporter ion intensities comprises an absolute ion intensity.

5. The method of claim 1, wherein the separation technique comprises a chromatographic separation.

6. The method of claim 1, wherein the separation technique comprises an electrophoretic separation.

7. The method of claim 1, wherein the mass analysis technique comprises a single-stage mass spectrometry.

8. The method of claim 1, wherein the selecting an analyte intensity at each of at least two times comprises selecting a first analyte intensity near a maximum intensity of the eluting analyte and selecting a second analyte intensity near a minimum intensity of the eluting analyte.

9. The method of claim 8, wherein the first analyte intensity and the second analyte intensity are selected by calculating a derivative of the measured intensities of the eluting analyte.

10. The method of claim 1, wherein the performing tandem mass spectrometry on the eluting analyte at each of the at least two times comprises selecting the analyte in a first mass analysis of the tandem mass spectrometry and fragmenting the analyte and measuring the plurality of reporter ion intensities in a second mass analysis of the tandem mass spectrometry.

11. The method of claim 1, wherein the creating the system of linear equations comprises constraining the background noise intensity to be invariant for calculations made for each of the two or more isobaric labels.

12. The method of claim 1, wherein the creating the system of linear equations comprises constraining the background noise intensity to be invariant for calculations made for each of the at least two times.

13. The method of claim 1, further comprising estimating the fragment efficiency by solving the system of linear equations for the fragment efficiency.

14. The method of claim 1, further comprising using the background noise intensity to correct a ratio of a first reporter ion intensity to a second reporter ion intensity.

15. The method of claim 1, wherein the two or more isobaric labels comprise isobaric tag for relative and absolute quantitation (ITRAQ™ reagent) labels.

16. A system for calculating a corrected reporter ion intensity in tandem mass spectrometry based quantitation using isobaric labels, comprising:

a separation device that elutes an analyte from a mixture of samples, wherein the analyte in each of two or more samples of the mixture of samples is labeled with a different isobaric label resulting in the use of two or more isobaric labels;

a mass spectrometer that receives the eluting analyte from the separation device, measures intensities of the eluting analyte, selects an analyte intensity at each of at least two times during elution of the analyte from the measured intensities of the eluting analyte producing at least two analyte intensities, performs tandem mass spectrometry on the eluting analyte at each of the at least two times, and measures a plurality of reporter ion intensities that represent each permutation of the two or more isobaric labels and the at least two times; and a processor that is connected to the mass spectrometer, receives the at least two analyte intensities and the plurality of reporter ion intensities from the mass spectrometer, creates a system of linear equations expressing each reporter ion intensity of the plurality of reporter ion intensities as a sum of a background noise intensity and a product of a fragmentation efficiency and one of the at least two analyte intensities, and calculates a corrected reporter ion intensity from a solution of the system of linear equations.

17. The system of claim 16, wherein the processor calculates the corrected reporter ion intensity from a solution of the system of linear equations by solving the system of linear equations for the background noise intensity and subtracting the background noise intensity from at least one reporter ion intensity of the plurality of reporter ion intensities to produce the corrected reporter ion intensity.

18. The system of claim 16, wherein the separation device comprises a chromatographic device.

19. The system of claim 16, wherein the separation device comprises an electrophoretic device.

20. The system of claim 16, wherein the mass spectrometer comprises one of a magnetic four-sector mass spectrometer, a tandem time-of-flight mass spectrometer, a triple quadrupole mass spectrometer, an ion-trap mass spectrometer, and a hybrid quadrupole time-of-flight (Q-TOF) mass spectrometer.

21. A method for calculating a corrected reporter ion intensity from tandem mass spectrometry based quantitation using isobaric labels, comprising:

obtaining a first analyte intensity of the analyte at a first time;

performing a first tandem mass spectrometry acquisition at the first time;

measuring a first reporter ion intensity for a first isobaric label and a second reporter ion intensity for a second isobaric label from the first tandem mass spectrometry;

obtaining a second analyte intensity of the analyte at a second time;

performing a second tandem mass spectrometry acquisition at the second time;

measuring a third reporter ion intensity for the first isobaric label and a fourth reporter ion intensity for the second isobaric label from the second tandem mass spectrometry; and calculating a corrected reporter ion intensity from the first analyte intensity, the second analyte intensity, the first reporter ion intensity, the second reporter ion intensity, the third reporter ion intensity, and the fourth reporter ion intensity.

22. The method of claim 21, wherein the calculating the corrected reporter ion intensity from the first analyte intensity, the second analyte intensity, the first reporter ion intensity, the second reporter ion intensity, the third reporter ion intensity, and the fourth reporter ion intensity comprises calculating a background noise intensity from the first analyte intensity, the second analyte intensity, the first reporter ion intensity, the second reporter ion intensity, the third reporter ion intensity, and the fourth reporter ion intensity and subtracting the background noise intensity from the first reporter ion intensity to produce the corrected reporter ion intensity.

23. The method of claim 22, wherein the background noise intensity is constrained to be the same for the first isobaric label and the second isobaric label.

24. The method of claim 22, wherein the background noise intensity is constrained to be the same for the first time and the second time.

* * * * *